Patented Apr. 4, 1944

2,346,013

UNITED STATES PATENT OFFICE 2,346,013

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application July 31, 1940,
Serial No. 349,008

7 Claims. (Cl. 260—205)

This invention relates to new azo dye compounds and their application to the art of coloring.

I have discovered that the azo compounds having the general formula:

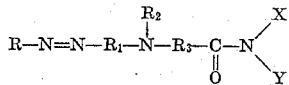

wherein R represents the residue of a member selected from the group consisting of a benzene, a naphthalene, a benzothiazole and a benzoxazole nucleus, $R_1$ represents the residue of a member selected from the group consisting of a benzene and a naphthalene nucleus, $R_2$ represents a member selected from the group consisting of hydrogen, an aliphatic group, a cycloalkyl group, a furyl nucleus, a

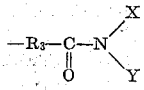

group, and a phenyl nucleus, $R_3$ represents a short chain saturated aliphatic hydrocarbon group and X and Y each represents a member selected from the group consisting of hydrogen, an aliphatic group, a cycloalkyl group, a furyl nucleus, a phenyl nucleus, an amino group and a

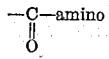

group constitute a valuable class of dye compounds.

Ordinarily, the

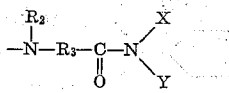

group is joined to the nucleus represented by $R_1$ in para position to the azo bond shown. Similarly, R and $R_1$ are ordinarily benzene nuclei while $R_2$, X and Y are normally hydrogen or alkyl. $R_3$ normally contains 1, 2, 3 or 4 carbon atoms. Depending upon their structure, the azo compounds of my invention possess application for the coloration of organic derivatives of cellulose, silk and wool. Coloration can be effected by dyeing, printing, stenciling or like methods.

Both sulfonated and non-sulfonated compounds are included within the scope of my invention. The nuclear non-sulfonated compounds have been found to be especially of value for the dyeing of organic derivatives of cellulose and it is to these compounds and their application for the dyeing of organic derivatives of cellulose that my invention is particularly directed. These nuclear non-sulfonated compounds likewise possess some application for the dyeing of wool and silk. For the dyeing of organic derivatives of cellulose such as cellulose acetate silk, nuclear non-sulfonated dye compounds wherein R and $R_1$ are benzene nuclei are generally advantageous.

The nuclear sulfonated compounds of my invention have little or no utility for the dyeing of organic derivatives of cellulose but possess application for the dyeing of wool and silk. Preferably when the dye compounds of my invention are to be employed for the dyeing of organic derivatives of cellulose they should contain no nuclear free carboxylic acid group. Red, yellow, orange-yellow, orange-red, greenish-blue, blue and violet dyeings, for example, can be obtained employing the dye compounds of my invention.

It is an object of my invention to provide a new class of azo dye compounds suitable for the coloration of organic derivatives of cellulose, wool and silk. Another object of my invention is to provide a process for the coloration of organic derivatives of cellulose, wool and silk. A further object is to provide colored textile materials which are of good fastness to light and washing. A particular object of my invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose or benzyl cellulose. While my invention will be illustrated more particularly in connection with the coloration of cellulose acetate silk, a material to which the invention is especially adapted, it will be understood that it applies to the coloration of other organic derivatives of cellulose such as those just named as well as to the coloration of wool and silk.

The azo dye compounds of my invention can be prepared by diazotizing diazotizable members selected from the group consisting of an arylamine of the benzene series, an aminonaphthalene, an aminobenzothiazole and an aminobenzoxazole and coupling the diazonium compounds obtained with the coupling compounds having the general formula:

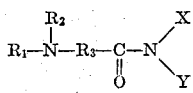

wherein $R_1$, $R_2$, $R_3$, X and Y have the meaning previously assigned to them.

It will be understood that the term "aliphatic" as used herein includes unsubstituted alkyl groups such as a methyl group, an ethyl group, a propyl group or a butyl group, as well as substituted alkyl groups such as β-hydroxyethyl, β-hydroxypropyl, β,γ-dihydroxypropyl, γ-hydroxypropyl, β-methoxyethyl, β-ethoxyethyl, β-sulfoethyl and the alkyl esters of the hydroxyalkyl groups named, for example. The term "aliphatic" also includes unsaturated groups such as allyl,

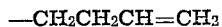

and

for example. Illustrative of cycloalkyl may be mentioned cyclobutyl, cyclohexyl, and cycloheptyl. Similarly, illustrative of furyl may be mentioned a furyl radical such as furfuryl, tetrahydrofurfuryl, 5-ethylfuryl and 5-β-hydroxyethyltetrahydrofurfuryl. The term "amino" includes the amino group as well as substituted amino groups, such as methylamino, ethylamino, dimethylamino, mono-β-hydroxyethylamino, di-β-hydroxyethylamino and monoglycerylamino.

The nuclei designated by R and $R_1$ can be substituted with substituents such as a nitro group, a halogen atom, a hydroxy group, an alkyl group, an alkoxy group, a cyano group, a sulfonamide group, a carboxamide group, a carboxylic acid radical and a sulfonic acid radical, for example. Similarly, when $R_2$, X and Y represent a phenyl nucleus, the phenyl nucleus can be either unsubstituted or substituted with substituents such as a halogen atom, an alkoxy group, an amino group and a hydroxy group, for example.

The following examples illustrate the preparation of the compounds of my invention:

Example 1

12.8 grams of o-chloroaniline are dissolved in 150 cc. of water to which has been added 25 cc. of 36% hydrochloric acid. The resulting solution is cooled to 0-5° C. by the addition of ice, for example, and the o-chloroaniline is diazotized by the addition, with stirring, of 6.9 parts of sodium nitrite dissolved in water. Throughout the diazotization reaction the temperature of the reaction mixture is maintained at, for example, 0-5° C.

16.4 grams of

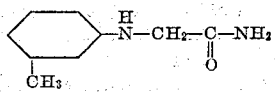

are dissolved in a dilute hydrochloric acid solution and the resulting solution is cooled to a temperature approximating 0-10° C. The diazo solution prepared as described above is then added with stirring, while maintaining the reaction mixture in a cooled condition. The coupling reaction which takes place is completed by adding sodium acetate until the reaction mixture is neutral to Congo red paper following which the dye compound formed is recovered by filtration, washed with water and dried. The dye compound obtained colors cellulose acetate silk yellow.

By the substitution of an equivalent gram molecular weight of a coupling component corresponding to that employed in the example, except that the methyl group is ortho position to the substituted amino group, a dye compound of my invention can likewise be obtained.

Example 2

13.5 grams of p-aminoacetophenone are diazotized and the diazonium compound obtained is coupled with 19.2 grams of

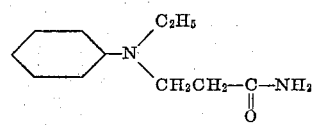

Coupling and recovery of the dye compound formed can be carried out in accordance with the general procedure described in Example 1. The dye compound obtained colors cellulose acetate silk orange.

Example 3

13.8 grams of p-nitroaniline are diazotized and the diazonium compound obtained is coupled with 23.7 grams of

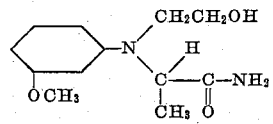

Coupling and recovery of the dye compound formed can be carried out in accordance with the general procedure described in Example 1. The dye compound obtained colors cellulose acetate silk red.

Example 4

17.3 grams of 1-amino-2-chloro-4-nitrobenzene are diazotized and the diazonium compound obtained is coupled with 25.6 grams of

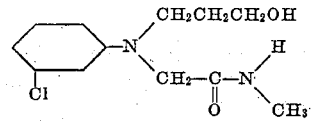

The dye compound obtained colors cellulose acetate silk red.

Example 5

21.7 grams of 1-amino-2-bromo-4-nitrobenzene are diazotized and the diazonium compound obtained is coupled with 29.6 grams of

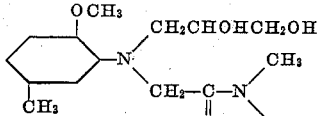

The dye compound obtained colors cellulose acetate silk rubine.

Example 6

26.4 grams of 1-amino-2-iodo-4-nitrobenzene are diazotized and the diazonium compound obtained is coupled with 21.6 grams of

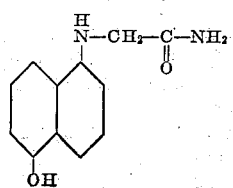

The dye compound obtained colors cellulose acetate silk a violet shade.

By the use of a similar coupling component but in which the

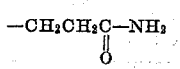

group attached to the nitrogen atom is replaced by a

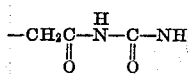

or a

—CH₂C—N—C—NH₂
     ‖  H  ‖
     O     O group, for example, dye compounds of my invention which similarly color cellulose acetate silk a violet shade can be obtained.

*Example 7*

16.3 grams of 1-amino-2-cyano-4-nitrobenzene are diazotized and the diazonium compound omtained is coupled with 38 grams of

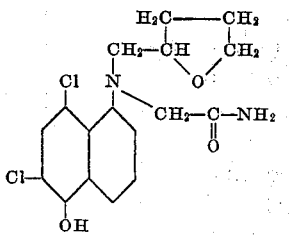

The dye compound obtained colors cellulose acetate silk blue.

*Example 8*

18 grams of 6-methoxy-2-aminobenzothiazole are diazotized in known fashion and the diazonium compound obtained is coupled with 31.4 grams of

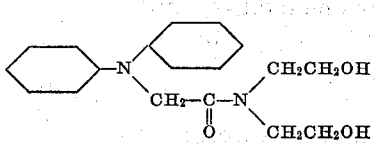

The dye compound obtained colors cellulose acetate silk red.

*Example 9*

18.3 grams of 1-amino-2,4-dinitrobenzene are diazotized and the diazonium compound obtained is coupled with 31.6 grams of

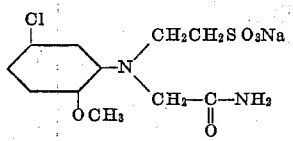

The dye compound obtained colors cellulose acetate silk rubine.

*Example 10*

26.2 grams of 1-amino-2,4-dinitro-6-bromobenzene are diazotized and the diazonium compound obtained is coupled with .1 gram mole of

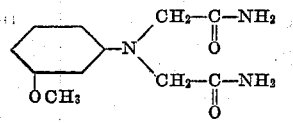

The dye compound obtained colors cellulose acetate silk violet.

*Example 11*

33.2 grams of

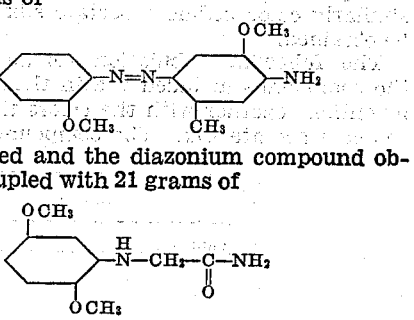

are diazotized and the diazonium compound obtained is coupled with 21 grams of

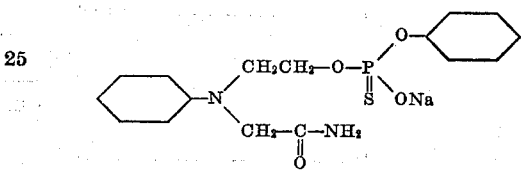

The dye compound obtained colors cellulose acetate silk rubine.

*Example 12*

24.4 grams of dianisidine are diazotized and the diazonium compound obtained is coupled with 81 grams of

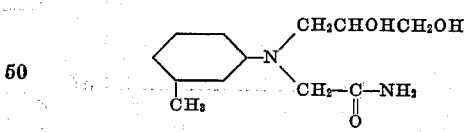

The dye compound obtained colors cellulose acetate silk orange.

The corresponding phosphoric acid ester or phosphorous acid ester group can be substituted for the thiophosphoric acid ester group attached to the nitrogen atom of the coupling component to obtain dye compounds of my invention. Similarly, it will be understood that the phenyl group forming a part of the thiophosphoric acid group can be replaced by hydrogen, an alkyl group, or a furyl group, for example.

*Example 13*

1 gram mole of 2-amino-3,5-dinitrobenzenesulfonethylamide is diazotized and the diazonium compound obtained is coupled with 1 gram mole of

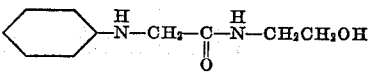

The dye compound obtained colors cellulose acetate silk violet.

*Example 14*

1 gram mole of p-nitroaniline is diazotized and the diazonium compound obtained is coupled with 1 gram mole of

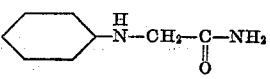

The dye compound obtained colors cellulose acetate silk orange.

By the substitution of an equivalent gram molecular weight of

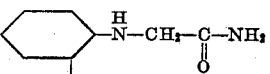

and for example, for the coupling component of the example, dye compounds of my invention which similarly color cellulose acetate silk orange can be obtained.

The following tabulation further illustrates the compounds included within the scope of my invention together with the colors they yield on cellulose acetate silk. The compounds indicated below can be prepared by diazotizing the amines listed under the heading "Amine" and coupling the diazonium compounds obtained with the compounds specified in the column entitled "Coupling component." The diazotization and coupling reactions may, for example, be carried out following the general procedure described hereinbefore.

| Amine | Coupling component | Color |
|---|---|---|
| Aniline | (1) cyclohexyl-N(CH$_3$)-CH$_2$-C(=O)-NH$_2$ | Yellow. |
| Do | (2) cyclohexyl-N(CH$_2$CHOHCH$_2$OH)-CH$_2$-C(=O)-N(CH$_3$)(CH$_2$CH$_2$OH) | Do. |
| Do | (3) (2-OCH$_3$, 4-CH$_3$-cyclohexyl)-NH-CH$_2$-C(=O)-N(H)-C(=O)-NH$_2$ | Do. |
| Do | (4) (CH$_3$-cyclohexyl)-N(CH$_2$CH$_2$OSO$_3$NH$_4$)-CH$_2$-C(=O)-NH$_2$ | Do. |
| Do | (5) (Cl-cyclohexyl)-N(cyclohexyl)-CH$_2$-C(=O)-NH$_2$ | Do. |
| Do | (6) (Cl-cyclohexyl)-NH-CH$_2$CH$_2$CH$_2$CH$_2$-C(=O)-NH$_2$ | Do. |
| Do | (7) (CH$_3$-cyclohexyl)-NH-CH$_2$-C(=O)-N(H)-cyclohexyl | Do. |
| Do | (8) (OCH$_3$-cyclohexyl)-NH-CH$_2$-C(=O)-N(H)-tetrahydrofurfuryl | Do. |
| Do | (9) naphthyl-NH-CH$_2$-C(=O)-NH$_2$ | Orange. |
| Do | (10) naphthyl-N(CH$_2$CH$_2$-C(=O)-NH$_2$)(CH$_2$-C(=O)-NH$_2$) | Do. |
| Do | (11) (OCH$_3$-naphthyl)-N(CH$_2$CHOHCH$_3$)-CH$_2$-C(=O)-NH$_2$ | Do. |

| Amine | Coupling component | Color |
|---|---|---|
| Aniline | (12) [structure: chloro-naphthol with NH-CH₂-C(O)-NH₂ substituent] | Orange. |
| Do | (13) [structure: dihydroxy-naphthalene with NH-CH₂-C(O)-NH-CH₂CH₂OH substituent] | Do. |
| o-(Cl, F, Br, I) aniline | 1-8 above | Yellow. |
| p-(Cl, F, Br, I) aniline | do | Do. |
| 2,4-dichloroaniline | do | Orange-yellow. |
| 1-amino-2-methoxy-5-chlorobenzene | do | Yellow. |
| 1-amino-2-methyl-4-bromobenzene | do | Do. |
| 1-amino-2-chloro-4-methoxybenzene | do | Do. |
| p-aminoacetophenone | do | Orange. |
| m-nitroaniline | do | Yellowish-orange. |
| 1-amino-2-nitro-4-chlorobenzene | do | Orange-red. |
| 1-amino-2-chloro-4-nitrobenzene | do | Rubine. |
| Do | 9-11 above | Violet. |
| Do | 12-13 above | Blue. |
| 1-amino-2-methoxy-4-nitrobenzene | 1-8 above | Red to rubine. |
| 1-amino-2-ethyl-4-nitrobenzene | do | Red. |
| 2-amino-6-methoxybenzothiazole | do | Red to wine. |
| Do | 9-11 above | Do. |
| Do | 12-13 above | Greenish-blue. |
| 2-amino-6-methoxybenzoxazole | 1-8 above | Red to wine. |
| Do | 9-11 above | Do. |
| Do | 12-13 above | Greenish-blue. |
| 1-amino-4-nitro-6-cyanobenzene | 1-8 above | Rubine to wine. |
| 2-amino-5-nitrophenylmethylsulfone | do | Do. |
| 5-nitro-2-aminophenol | do | Do. |
| 2,4-dinitroaniline | do | Rubine to purple. |
| Do | 9-11 above | Violet. |
| Do | 12-13 above | Greenish-blue. |
| 1-amino-2,4-dinitro-6-chlorobenzene | 1-8 above | Wine to deep violet. |
| Do | 9-11 above | Blue. |
| Do | 12-13 above | Greenish-blue. |
| 1-amino-2,4-dinitronaphthalene | 1-8 above | Wine to deep purple. |
| α-naphthylamine | do | Orange. |
| Do | 9-11 above | Red. |
| Do | 12-13 above | Violet. |
| 1-amino-2-cyano-4-nitrobenzene | do | Blue. |

While the application of the nuclear non-sulfonated dye compounds of my invention has been described more particularly in connection with the coloration of cellulose acetate silk, it will be understood that these dye compounds yield generally similar shades on other organic derivatives of cellulose as well as wool and silk.

Nuclear sulfonated compounds of my invention can be prepared by sulfonation of the nuclear non-sulfonated compounds in accordance with known sulfonation methods or by the use of previously sulfonated components. Suitable sulfonated amines that can be diazotized and employed in the preparation of compounds of my invention include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-naphthol-7-sulfonic acid, metanilic acid, 1-amino-2-sulfonic-4-nitrobenzene, 1-amino-2,4-disulfonic benzene and 1-amino-2-chloro-4-sulfonic benzene.

Although a large number of examples of dye compounds have been given, it is to be understood that these examples are illustrative and not limitative of my invention. Any of the diazo components shown herein, for example, can be coupled with any of the coupling components shown to give compounds included within the scope of my invention. To illustrate, 2-amino-5-nitrophenylmethyl-sulfone can be diazotized and the diazonium compound obtained coupled with the coupling component of Example 6 to obtain a dye compound which colors cellulose acetate silk, for instance, greenish-blue.

In order that the preparation of the compounds of my invention may be entirely clear, it is here noted that the coupling components employed in their preparation can be prepared after the general methods described in Berichte der Deutschen Chemischen Gesellschaft, vol. 8, pages 1157 and 1158 (1875); Berichte der Deutschen Chemischen Gesellschaft, vol. 17, pages 2662 to 2664, inclusive, (1884); Liebig's Annalen, vol. 301, page 72 (1898) and German Patents Nos. 142,559 and 156,760. In the majority of instances these references describe the preparation of coupling components in which the members X and Y represent hydrogen but compounds wherein X and Y are other than hydrogen can be prepared by methods known for the introduction of such groups into an amine group. To illustrate, compounds wherein X and Y represent hydroxyalkyl can be prepared by treatment of the unsubstituted compounds with an alkylene oxide such as ethylene oxide or propylene oxide. From the foregoing, it is believed that the preparation of the coupling components employed will be obvious.

The azo dye compounds of my invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material to be dyed may be added to the dyebath and the dyeing operation conducted in known fashion. The dye compounds of my invention which are water soluble do not, of course, require the use of a dispersing or solubilizing agent but may be applied to silk, wool and (depending upon the nature and position of the water solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey U. S. Letters Patent No. 2,115,030, issued April 26, 1938. For a more detailed description as to how the water soluble azo dyes of my invention may be employed for the coloration of textile materials made of or containing organic derivatives of cellulose, silk and wool or mixtures of these, reference may be had to McNally and Dickey U. S. Patent No. 2,107,898, issued February 8, 1938.

I claim:

1. The non-sulfonated azo dye compounds having the general formula:

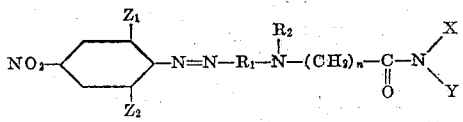

wherein $Z_1$ represents a member selected from the group consisting of hydrogen, a nitro group, a chlorine atom, a bromine atom, a low carbon alkyl group, a low carbon alkoxy group, an alkyl sulfone group, and a hydroxy group, $Z_2$ represents a member selected from the group consisting of hydrogen, a chlorine atom and a bromine atom, $R_1$ represents a member selected from the group consisting of a benzene and a naphthalene nucleus, $R_2$ represents a member selected from the group consisting of hydrogen and a low carbon aliphatic group, $n$ stands for a small whole positive number, X and Y each represents a member selected from the group consisting of hydrogen, and a low carbon aliphatic group and wherein the

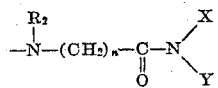

group is joined to the nucleus represented by $R_1$ in para position to the azo bond.

2. The non-sulfonated azo dye compounds having the general formula:

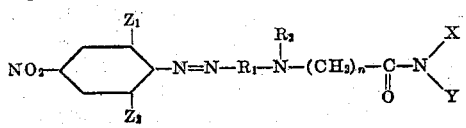

wherein $Z_1$ represents a member selected from the group consisting of hydrogen, a nitro group, a chlorine atom, a bromine atom, a low carbon alkyl group, a low carbon alkoxy group, an alkyl sulfone group, and a hydroxy group, $Z_2$ represents a member selected from the group consisting of hydrogen, a chlorine atom and a bromine atom, $R_1$ represents a benzene nucleus, $R_2$ represents a member selected from the group consisting of hydrogen and a low carbon aliphatic group, $n$ stands for a small whole positive number, X and Y each represents a member selected from the group consisting of hydrogen, and a low carbon aliphatic group and wherein the

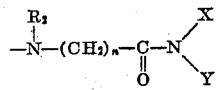

group is joined to the nucleus represented by $R_1$ in para position to the azo bond.

3. The non-sulfonated azo dye compounds having the general formula:

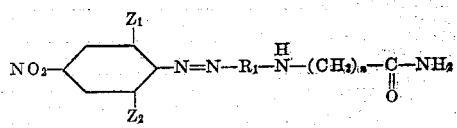

wherein $Z_1$ represents a member selected from the group consisting of hydrogen, a nitro group, a chlorine atom, a bromine atom, a low carbon alkoxy group, an alkyl sulfone group, and a hydroxy group, $Z_2$ represents a member selected from the group consisting of hydrogen, a chlorine atom, and a bromine atom, $R_1$ represents a benzene nucleus, $n$ stands for a small whole positive number and wherein the

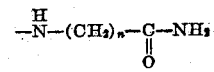

group is joined to the benzene nucleus represented by $R_1$ in para position to the azo bond.

4. The non-sulfonated azo dye compounds having the general formula:

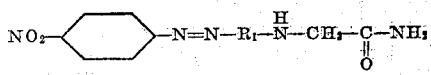

wherein $R_1$ represents a benzene nucleus and wherein the

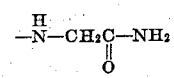

group is joined to the benzene nucleus represented by $R_1$ in para position to the azo bond.

5. The azo dye having the formula:

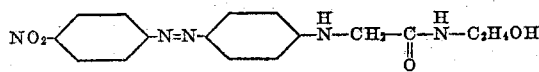

6. The azo dye having the formula:

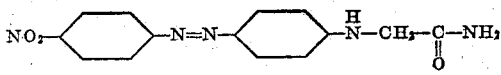

7. The azo dye having the formula:

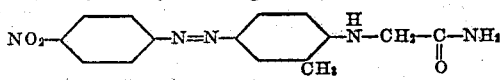

JOSEPH B. DICKEY.